United States Patent
McArdell et al.

(10) Patent No.: US 9,693,015 B2
(45) Date of Patent: Jun. 27, 2017

(54) PRESENTATION AND DISPLAY EQUIPMENT

(71) Applicants: Roger Nicholas McArdell, London (GB); Roger Alan Vinton, London (GB)

(72) Inventors: Roger Nicholas McArdell, London (GB); Roger Alan Vinton, London (GB); Noel Liam Packer, London (GB)

(73) Assignees: Roger Nicholas McArdell, London (GB); Roger Alan Vinton, London (GB)

( * ) Notice: Subject to any disclaimer, the term of this patent is extended or adjusted under 35 U.S.C. 154(b) by 72 days.

(21) Appl. No.: 14/541,215

(22) Filed: Nov. 14, 2014

(65) Prior Publication Data

US 2015/0138304 A1    May 21, 2015

Related U.S. Application Data

(63) Continuation-in-part of application No. PCT/EP2013/059852, filed on May 13, 2013.

(30) Foreign Application Priority Data

May 14, 2012    (GB) .................................. 1208601.3

(51) Int. Cl.
| | |
|---|---|
| *H04N 7/10* | (2006.01) |
| *F16M 11/00* | (2006.01) |
| *F16M 13/00* | (2006.01) |
| *A47B 21/00* | (2006.01) |
| *A47B 37/00* | (2006.01) |

(Continued)

(52) U.S. Cl.
CPC ............. *H04N 7/142* (2013.01); *A47B 21/00* (2013.01); *H04N 7/15* (2013.01); *A47B 2200/0073* (2013.01); *A47B 2200/0079* (2013.01); *A47B 2200/0084* (2013.01); *F16M 11/00* (2013.01); *F16M 2200/08* (2013.01)

(58) Field of Classification Search
CPC .. A47B 21/00; A47B 9/04; A47B 9/20; A47B 2200/0073; A47B 2200/0079; F16M 11/00; F16M 2200/08; H04N 7/15; H04N 7/142
USPC ...... 248/122.1, 125.8, 126, 917; 361/679.04, 361/679.21; 108/50.02, 150; 312/223.1, 312/351.2, 7.2
See application file for complete search history.

(56) References Cited

U.S. PATENT DOCUMENTS

| | | |
|---|---|---|
| 3,913,880 A | 10/1975 | Lucasey et al. |
| 5,796,576 A | 8/1998 | Kim |

(Continued)

FOREIGN PATENT DOCUMENTS

DE    102010047201 A1    4/2012

OTHER PUBLICATIONS

International Search Report and Written Opinion mailed Jan. 20, 2014 (PCT/EP2013/059852); ISA/EP.

(Continued)

*Primary Examiner* — Tan Le
(74) *Attorney, Agent, or Firm* — Banner & Witcoff, Ltd.

(57) ABSTRACT

A presentation and display system comprising a pedestal mounted on a plinth and a display screen or monitor carried by the pedestal, in which the individual components of the system are secured together by manually operable releasable fasteners.

14 Claims, 9 Drawing Sheets

(51) Int. Cl.
*H04N 7/14* (2006.01)
*H04N 7/15* (2006.01)

(56) References Cited

U.S. PATENT DOCUMENTS

| | | | | |
|---|---|---|---|---|
| 8,051,782 | B2 * | 11/2011 | Nethken | A47B 21/02 |
| | | | | 108/50.01 |
| 8,403,273 | B2 * | 3/2013 | Takamatsu | F16M 11/00 |
| | | | | 248/122.1 |
| 9,167,894 | B2 * | 10/2015 | DesRoches | A47B 9/20 |
| 2005/0062844 | A1 | 3/2005 | Ferren et al. | |
| 2006/0289716 | A1 | 12/2006 | Cai | |
| 2008/0237414 | A1 | 10/2008 | Lien et al. | |
| 2009/0057502 | A1 | 3/2009 | Takamatsu et al. | |
| 2009/0133609 | A1 * | 5/2009 | Nethken | A47B 21/02 |
| | | | | 108/50.02 |
| 2010/0281438 | A1 * | 11/2010 | Latta | A63F 13/06 |
| | | | | 715/863 |
| 2011/0096138 | A1 * | 4/2011 | Grimshaw | H04M 3/567 |
| | | | | 348/14.08 |
| 2011/0128213 | A1 | 6/2011 | Wu et al. | |
| 2012/0038742 | A1 | 2/2012 | Robinson et al. | |
| 2014/0312754 | A1 * | 10/2014 | Hecht | A47B 9/04 |
| | | | | 312/309 |

OTHER PUBLICATIONS

UKIPO Search Report mailed Aug. 22, 2012 (GB1208601.3).
GB Application 1208601.3, Examination Report, dated Mar. 16, 2016.

\* cited by examiner

PRESENTATION AND DISPLAY EQUIPMENT

CROSS-REFERENCE TO RELATED APPLICATIONS

The present application is a continuation-in-part application of, and claims priority to, International PCT Application Serial No. PCT/EP2013/059852, entitled "Improvements in or relating to presentation and display equipment," filed May 13, 2013, which claims priority to United Kingdom Patent Application No. 1208601.3, filed May 14, 2012, each of which are hereby incorporated by reference in their entirety for all purposes.

FIELD OF INVENTION

The present invention relates generally to presentation and display equipment, and particularly to such equipment suitable for use in a presentation, teleconferencing and/or telepresence environment.

BACKGROUND

The use of remote conferencing facilities, sometimes referred to as teleconferencing, and the increase in use of computer-generated or web-based presentations of information have given rise to the increasing use of presentation, teleconferencing and telepresence environments. As used in this specification the term "presentation and display" will be understood to mean any form of electronic display, teleconferencing or telepresentation environment and to include any combination of these.

However, different standards of connectivity and communications protocols throughout the world have made it extremely difficult and complex to produce individual units which meet all the necessary requirements. Inconsistent regional market maturity results in differing expectations and abilities, and the lack of skills, knowledge and experience in both installation and use of such presentation and display environments hampers their introduction in many places. This results in a high cost and extended deployment time, as well as limited access to resources, especially due to the resultant need for specialist knowledge in achieving all the appropriate interconnections. When properly installed and working, complex telepresentation facilities provide users with considerably enhanced communications and presentation opportunities, but, not least because of the inconsistent regional market maturity, partly resulting from the inconsistency in availability and quality of hardware and the lack of developed skills throughout the world, it is almost impossible to achieve global consistency. Furthermore, system components are not always readily available in every region and frequently an attempt to install a highly sophisticated integrated automated telepresentation environment, results in excess complexity and extended management time and costs, both for implementation and use. This is exacerbated by the lack of local skills and experience in many places, and frequently in order to meet local requirements non-standard solutions have been adopted. Standard systems would be more cost-effective in the long run, but cost is unpredictable from one region to another and currently results in a high cost of standardisation.

Maintenance of such complex equipment is also the cause of considerable difficulty and frustration.

SUMMARY OF INVENTION

The present invention seeks, therefore, to provide presentation and display facilities which can be installed without requiring specialist skills or labour, and without requiring specialist tools or, indeed, any tools, to set up and commission. Once commissioned, the display apparatus of the present invention allows a user simply to enter the environment and set to work without requiring specialist skills or training to use the communications equipment.

Simplicity of installation is difficult to achieve without considerable effort and understanding of the problems experienced by untrained users in operating such complex apparatus. Complete multimedia presentation and communications solutions that are intuitive, easy to use and which provide the technologies and facilities required by end users are made available by implementation of the present invention.

Another feature of the apparatus of the present invention is that it minimises power consumption by a strategy involving a minimum of standby time and is thus more environmentally friendly than previous such presentation and display equipment.

According to one aspect of the present invention, therefore, there is provided a presentation and display system comprising a pedestal mounted on a plinth and a display screen or monitor carried by the pedestal, in which the individual components of the system are secured together by manually operable releasable fasteners.

This arrangement makes it possible to assemble the equipment of which the system is comprised for installation without requiring any tools, which means this can be done quickly and efficiently by unskilled labour.

In a preferred embodiment the system further comprises an interface/transmitter unit having means for connection to a user input device (typically a laptop computer) and operable to transmit signals therefrom to an internal receiver/processor unit mounted on the said pedestal for display on the monitor or display unit.

The transmission of signals may be effected via a single cable, such as a twisted pair cable or other suitable single cable connection or, alternatively, may be made by wireless transmission from the interface/transmitter unit to a receiver unit in the pedestal. The physical configuration of the display and conferencing environment may thus be more freely achievable without requiring any limitations on the proximity of the user input device (the laptop computer) to the display pedestal.

In one embodiment the said receiver/processor unit is mounted on the said pedestal and held in place by manually operable releasable fastening means.

The pedestal preferably has a mount for receiving a codec unit connectable to the monitor or display unit. Such codec units are known in the videoteleconferencing world, and various items of equipment are made by different manufacturers and will not be described in more detail here.

The said plinth may have feet adjustable to vary the orientation of the monitor or display unit, and preferably the plinth further has manipulation means accessible from above the plinth for effecting adjustment of the said feet. This adjustment allows the display screen to be oriented exactly horizontally in both lateral and longitudinal directions despite any variations in the support surface.

For this purpose the said plinth may have means for indicating the orientation thereof upon adjustment of the said foot adjustment means. Such orientation indicators may, for example, take the form of spirit-level bubbles of conventional form, and there may be provided one dedicated to indicating each of two orthogonal directions of adjustment (say, fore and aft and side to side) or a single dome-shape spirit bubble indicator may be provided for this purpose.

The said plinth may include a decorative cover panel concealing the foot adjustment means. The pedestal likewise may have a front cover panel removably mounted thereon for replacement with alternative such panels. The front cover panel of the pedestal is preferably held in position by releasable fixing means, and such fixing means may, for example, be magnetic or otherwise manually manipulated so that the front cover panel may be removed easily without the requirement for tools. Magnetic fixings may be achieved by incorporating magnets in the pedestal itself and in the cover panel, in orientations such as to cause attraction between one another when placed in close proximity, or one or other of the pedestal and cover may be made from or incorporate components of a ferromagnetic material, and one or more individual magnets may be incorporated in the other of the said two components. In order to achieve a cushioned and almost noiseless connection upon assembly of the cover panels to the pedestal these may be provided with resilient pads in the vicinity of the magnets.

The said pedestal may also have a rear cover panel releasably mounted thereon and, like the front cover panel, this may be held in place by releasable connection means which may incorporate magnets.

The present invention also comprehends a plinth assembly for a presentation and display unit, for receiving a pedestal on which a display screen is mounted, the plinth assembly comprising a main plate-like element having a plurality of first, downwardly extending projections for receiving threaded fixing elements, at least two foot elements having openings through which the said first fixing projections extend, a plurality of upwardly extending second fixing projections, an upper cover plate having a plurality of openings through which the said second fixing projections pass, and manually manipulable releasable fixing means for securing the pedestal to the said plinth assembly.

In another aspect the present invention provides a plinth assembly for a presentation display unit, for receiving a pedestal on which a display screen is mounted, the plinth assembly comprising a plate-like main plinth element having at least two foot elements, and means for adjusting the distance between the foot elements and the said plate-like main plinth element whereby to adjust the inclination thereof, the said adjustment means being accessible from above the said plate-like main plinth element when standing on the said feet on a support surface, and cover means for concealing the said adjustment means.

Alternatively, the said adjustment means may be accessible from within the pedestal after it has been fitted, and the adjustment means may be concealed by a removable front cover panel of the pedestal.

Preferably the feet of the plinth unit do not extend entirely over the area of the plinth, leaving passages between the plinth and the support surface for receiving cables, for connecting component parts of the display apparatus with external utilisers such as a laptop computer or other signal input device.

The modular video conferencing and telepresence display apparatus of the present invention preferably also includes a worktable or desk having a connector module or interface device with a plurality of alternative connection sockets or cables by which a user may interconnect an input device of his own, such as a laptop computer, with the display system. The interface device on the worktable or desk may be connected wirelessly to the processor within the display stand, conveniently within the pedestal, or may be connected by a single twisted pair cable or other suitable single cable connection. The interface unit on the worktable or desk may also include a power supply socket as well as signal interconnection units, and may be presented as a separate desktop unit movable to any position on the worktable or desk, or may be fitted within the surface, flush therewith, in a predetermined location.

In order to accommodate different connection technologies, the interface unit may have a range of connectors for connecting to input systems having a wide range of different technologies. The interface unit also preferably incorporates an integral microphone to allow speech communication direct through the system with loud speakers in the display stand, or via remote connection to a corresponding receiver display stand in another location.

Connection sockets for a number of external microphones may also be provided to allow voice input from the entire room, should it be appropriate to receive inputs from more than one person during a presentation.

In its most general aspect, therefore, the present invention provides video conferencing and telepresence display apparatus, the component parts of which are secured together by manually manipulable releasable fasteners to allow assembly at the workplace, and possibly dismantling and repositioning within the workplace, in an entirely tools-free manner.

In another aspect the present invention provides a kit of parts for assembly into a presentation and telepresence display environment, comprising a plinth, a pedestal, a display screen and a worktable or desk, all securable to one another (apart from the desk, which may be freestanding) by manually manipulable releasable fasteners.

One convenient form of releasable fastener comprises a screw threaded stud fitted to one component to pass through an opening in another and receive a locking nut formed as or in a knob the size and shape of which is suitable for manipulation by hand. Such knob may have dimples or recesses in its surface to assist gripping, or may have a suitable shape for this purpose, for example having projecting lobes or arms. A triangular configuration with convex curved sides is particularly suitable for this purpose for example.

In a further aspect of the present invention there is provided a pedestal suitable for use in a modular video conferencing and telepresence display system, having a single spine panel with reinforced edges, a removable front panel and means for securing it to a plinth by manually manipulable fixing elements.

The reinforced edges may be in the form of flanges extending transversely of the plane of the central spine panel, and the cover panel may be secured to these flanges leaving a central space for reception of the electronic components of the display system.

Whatever the form of the display unit, it may be provided with a video camera mounted at a suitable location to view the interior of a chamber or room within which the system is fitted to capture images for transmission via the Internet or a satellite communication system to a remote location, or for display on the screen itself.

BRIEF DESCRIPTION OF THE DRAWINGS

Various embodiments of the present invention will now be more particularly described, by way of example only, with reference to the accompanying drawings, in which.

DETAILED DESCRIPTION

Figure 1:
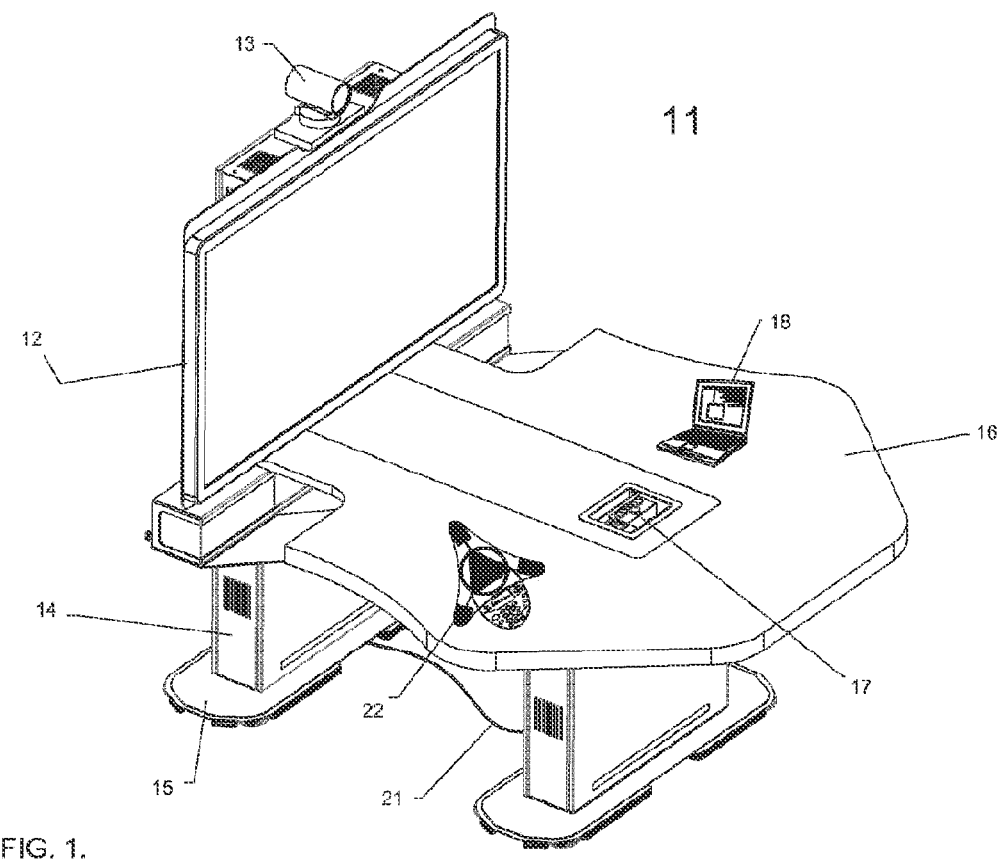
FIG. 1 is a schematic perspective view of a presentation and display system formed in accordance with the principles of the present invention.

Referring first to FIG. 1, there is shown in general perspective a system generally indicated 11 for providing a video conferencing and telepresence display environment, comprising a display screen 12 having a video camera 13 and mounted on a pedestal 14 carried on a plinth 15. A table or desk 16 has a connection interface 17 for connection of a user input device, in this embodiment illustrated as a laptop computer 18. The pedestal 14 carries a control processor 19 and a codec 20 (see FIG. 4 for example). In this embodiment the input interface unit 17 is connected to the control processor 19 by a twisted pair cable 21 although, in other embodiments not shown, the communication between the interface unit and the control processor may be by wireless signal using a suitable protocol, or may use some other suitable single cable connection. Cable 21 can extend between front and rear portions of the system as shown in FIG. 1, or can be hidden from view, such as by running in a channel or other such suitable cable holding means that can be mounted or disposed in or on the system, such as on or in the underside of the table for example. The desk or table 16 also carries an internet protocol (IP) telephone 22 connected to the interface unit 17 by a connector line 23.

Figure 2:
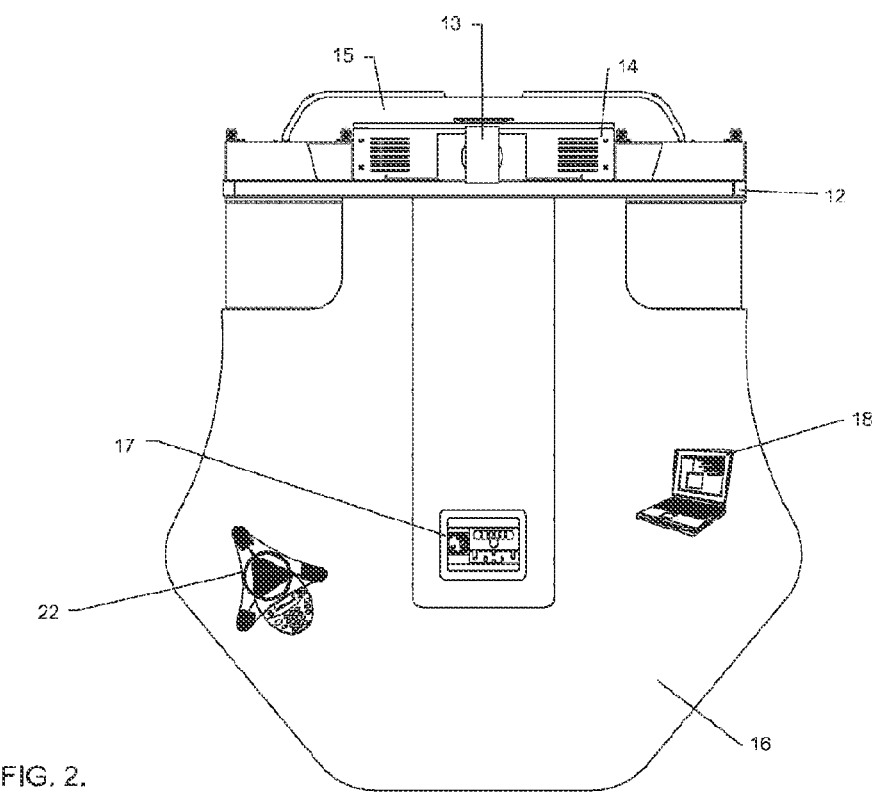
FIG. 2 is a plan view from above of the presentation and display system illustrated in FIG. 1.

The table 16 has a special or specific shape, as shown in the plan view of FIG. 2, to enable users grouped around the table to be in the field of view and focal range of a camera 13 mounted on or integrally formed with the system. In an example, camera 13 can include a motorised base that enables it to pan and tilt. For example, the camera can be made to focus more specifically on an item on desk 16. Movement can be effected by a remote user or by a user of the system 11. For example, a remote user may wish to focus in on a paper document or other article under discussion, and can control (or be provided with control, including temporary control) movement and/or focus of the camera to be able to view the document or article more readily.

A particular feature of the display apparatus of the present invention is the structural configuration which allows it to be assembled and dismantled for installation and/or reconfiguration without requiring any tools or specialist equipment.

Figure 3:
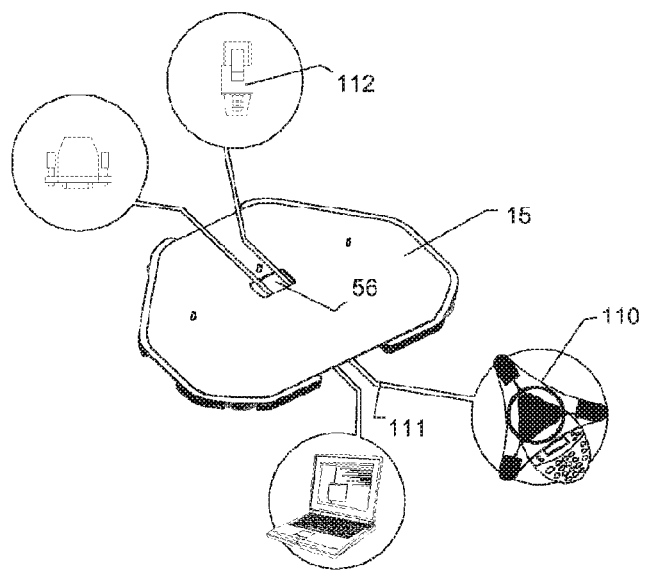
FIG. 3 is a perspective view on an enlarged scale of the plinth of the display unit.
Figure 9:
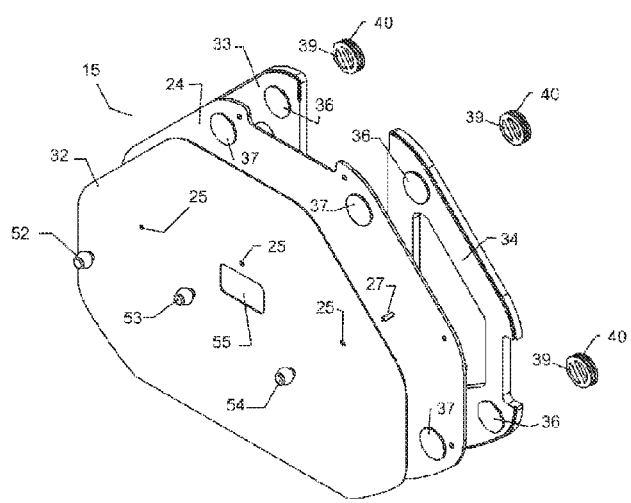
FIG. 9 is an exploded perspective view of an alternative plinth structure suitable for use with the embodiments of the invention described hereinabove.

As illustrated in FIG. 3 and FIG. 9, the plinth 15 comprises a main chassis plate 24 upwardly from which project three threaded studs 27 (only one of which is visible in FIG. 9) which upon assembly of the plinth pass through corresponding holes 25 in a cover plate 32 which overlies the chassis plate 24 to provide a cosmetic finish for the upper surface of the plinth 15. Two trapezoidal base plates 33, 34 are secured to the underside of the chassis plate 24 by studs (not shown) which pass through openings (not shown) and are secured in place by nuts (not shown). Resiliently padded feet 40 are secured to the underside of the base 33, 34 by engaging in respective threaded openings 36 in the base plates 33, 34 and threaded openings 37 in the chassis plate 24. The feet 40 are generally cup-shape and have a transverse bar 39 which separates the interior of the cup-shape foot into two recesses which can be engaged by a user's fingers to adjust the feet by screwing in or out of the base plate 33 or 34.

Figure 4:
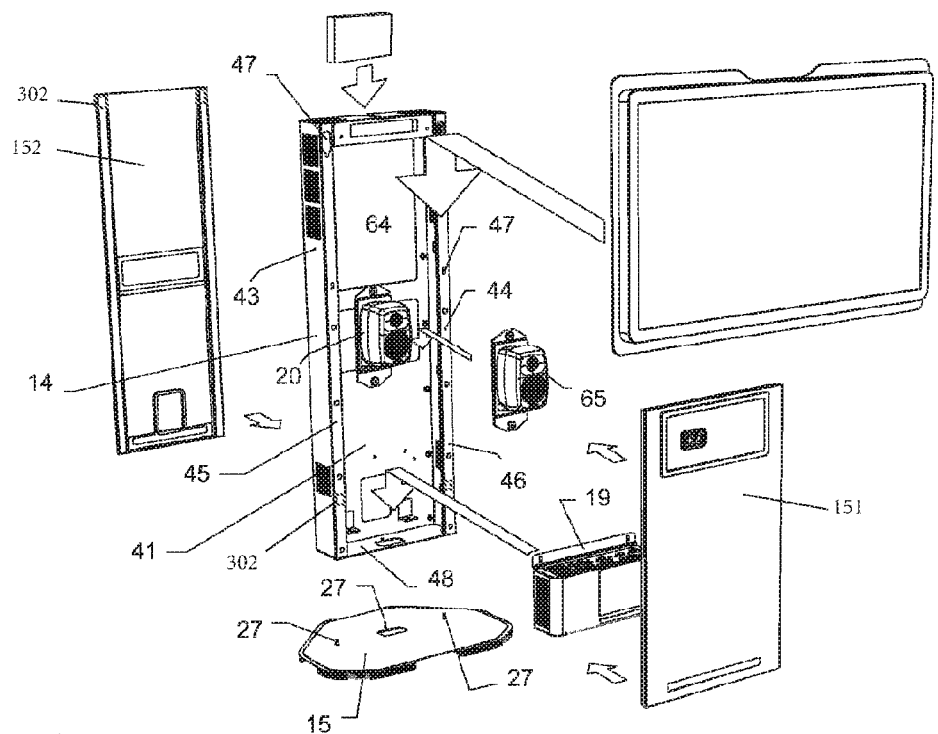
FIG. 4 is an exploded perspective view of the display unit illustrating the manner in which the component parts are interconnected.
Figure 5:
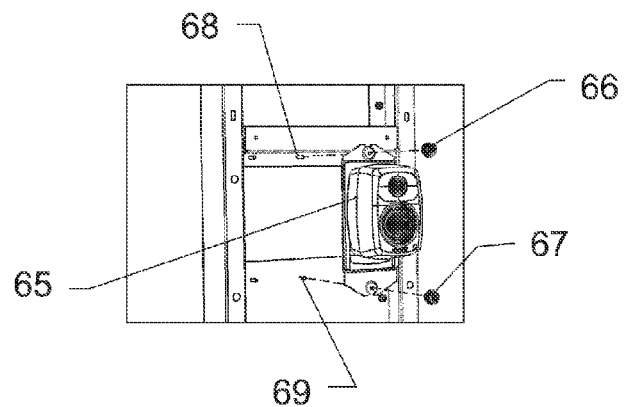
FIG. 5 is an enlarged perspective view of a part of the display unit of FIG. 4.
Figure 6:
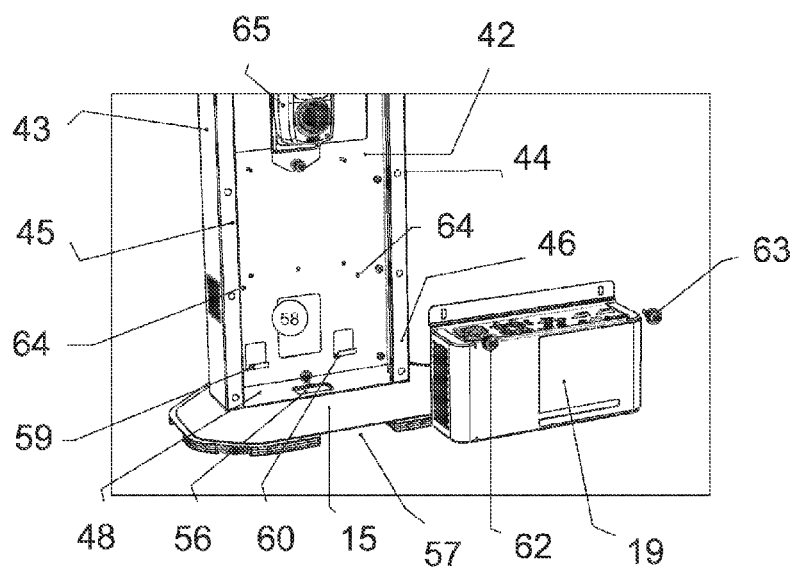
FIG. 6 is a similar enlarged perspective view of a lower part of the pedestal of FIGS. 4 and 5.

As can be seen in FIG. 4, the plinth 15 is secured to the pedestal 14 by means of the three upwardly projecting threaded studs 27. The pedestal 14 comprises an aluminium chassis 41 of generally C-shape cross section comprising a main spine plate 42 with a narrow side wall 43, 44 along each longitudinal edge. The side walls 43, 44 each have inwardly facing frontal flanges 45, 46 in which are formed four keyhole slots 47 which receive a mount for the display screen 12, as will be described in more detail below.

At its lower end the chassis 41 has a bottom plate 48 with three openings through which pass the three threaded studs 27 of the plinth 15. The pedestal 14 is then secured to the plinth 15 by means of three manually operable threaded fixing nuts or knobs 52, 53, 54. The pedestal and plinth can thus be assembled together quickly and easily simply by fitting the pedestal over the three studs 27 and screwing on the nuts or knobs 52, 53, 54 by hand.

The plinth 15 has a central aperture 55 which is in register with a corresponding aperture 56 in the bottom wall 48 of the pedestal 14, and the separation between the two feet 33, 34 leaves a space 57 in the under-surface of the plinth 15 for the passage of cables such as the cable 21 from the interface unit 17 to the interior of the pedestal 14.

The main spine panel 42 of the pedestal 14 has a lower opening 58 and two pressed hooks 59, 60 for receiving the control processor unit 19 which is secured in place by two screw threaded knobs 62, 63 which engage on threaded studs 64, 65 passing through openings in the main structural panel 42 of the pedestal 14. It will be appreciated that, although reference is made to hooks 59, 60, these elements can in fact be apertures in panel 42 or extensions therefrom that are shaped or otherwise profiled to receive a hook or similar that is part of unit 19. That is, the unit 19 can comprise hooks to engage with an element of the pedestal 14, which element can be an aperture, ledge, or other such suitable receiving means.

An intermediate aperture 64 in the main spine panel 42 of the pedestal 14 is provided to receive a Codec unit generally indicated 65 secured in place by two threaded knobs 66, 67 engaged on threaded studs 68, 69 which may be bolts passing through apertures in the spine plate 42, or may be threaded studs fixed thereto.

The pedestal chassis is made from aluminium and a front panel 151 and rear panel 152 can be removably fitted to the pedestal 14 and held in place by magnets 302, which may be carried on the panel and/or on the pedestal. This makes it possible to make cosmetic changes quickly and easily by providing a range of cover panels with different surfaces, or made of different materials, thereby allowing a user to match the equipment with the interior decoration of the room. Resilient pads, not shown cushion the meeting surfaces of the cover panels and the pedestal so that upon fitting the covers to the pedestal there is a quiet, practically noise free engagement avoiding the annoying click of metal-to-metal contact.

Figure 7:
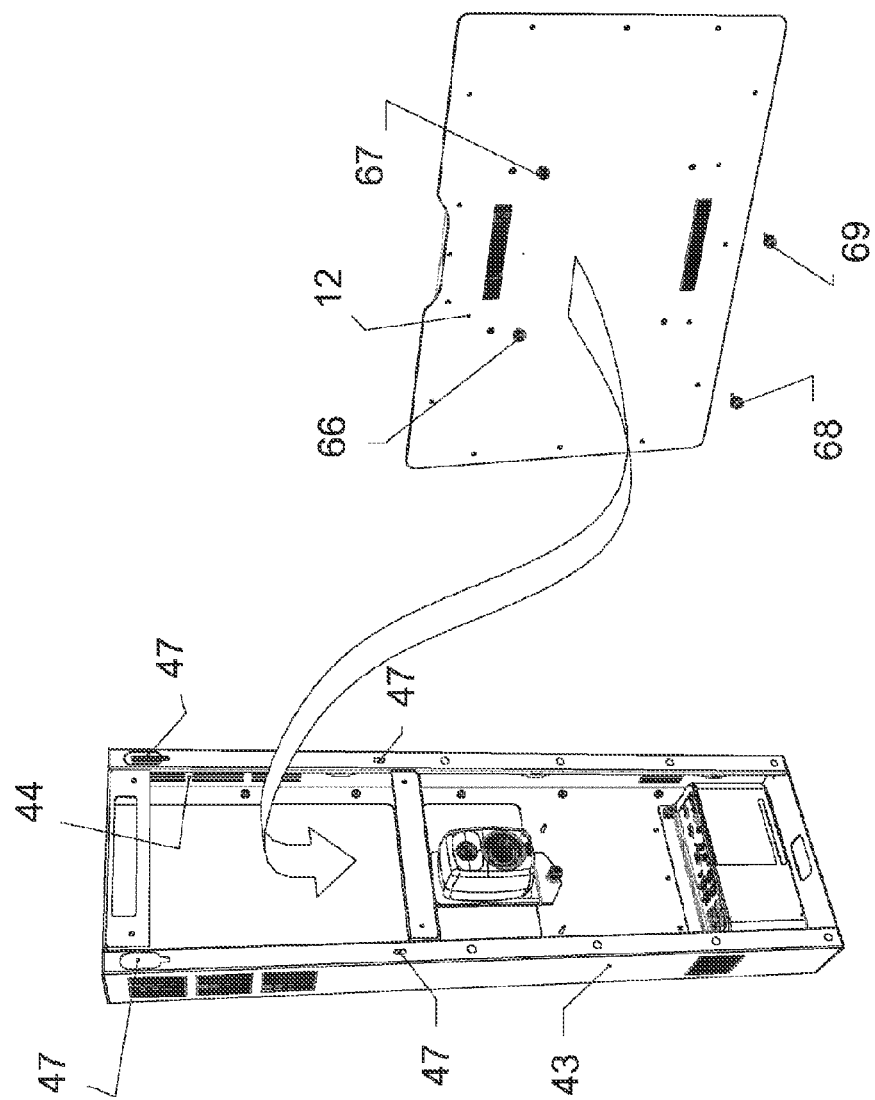
FIG. 7 is a perspective view of the chassis part of the pedestal of FIGS. 4 and 5, illustrating the installation of a mount for a third party codec.

FIG. 7 illustrates the rear of the display screen 12 having four projecting mushroom-headed studs 66, 67, 68, 69 which can be engaged in the keyhole slots 47 in the inwardly facing terminal flanges of the side walls 43, 44 of the pedestal chassis.

Figure 8:
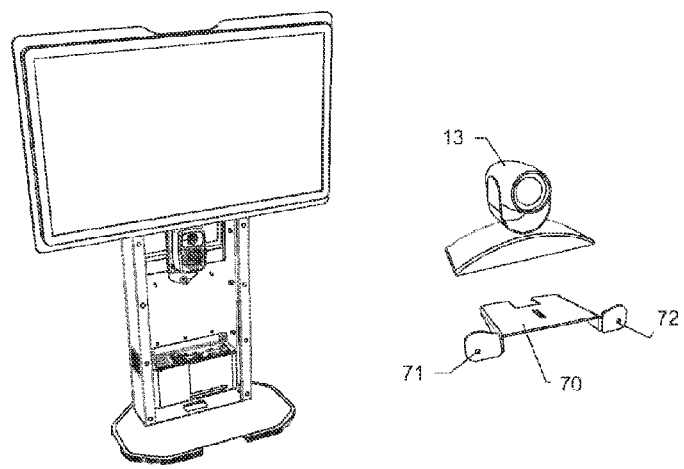
FIG. 8 is a schematic perspective view illustrating the installation of a video camera to the display unit.

FIG. 8 illustrates how a video camera 13 can be mounted on a bracket 70 and secured by two lugs 71, 72 and hand-operated knobs (not shown) to secure the video camera 13 in place.

Figure 10:
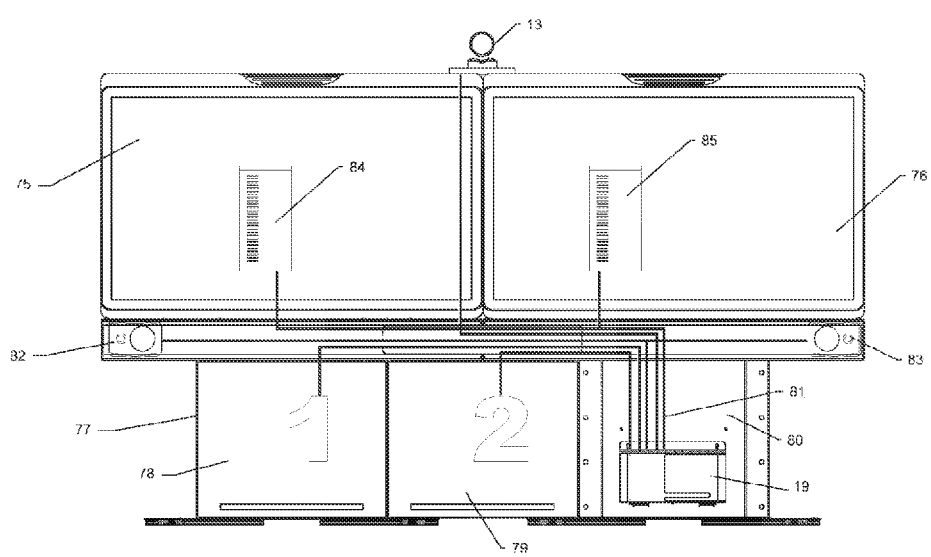
FIG. 10 is a schematic view illustrating a twin screen embodiment of the invention.

FIG. 10 illustrates an alternative embodiment in which there are provided two display screens 75, 76 on a somewhat larger pedestal 77 having three interior spaces 78, 79, 80 the first of which (78) is empty to receive auxiliary equipment, the second of which (79) is adapted to receive a custom Codec unit, and the third of which (80) receives the control processor 19. This latter is connected by internal cables 81 to loudspeakers 82, 83 and display control processors 84, 85 for controlling respective display screen 75, 76.

Figure 11:
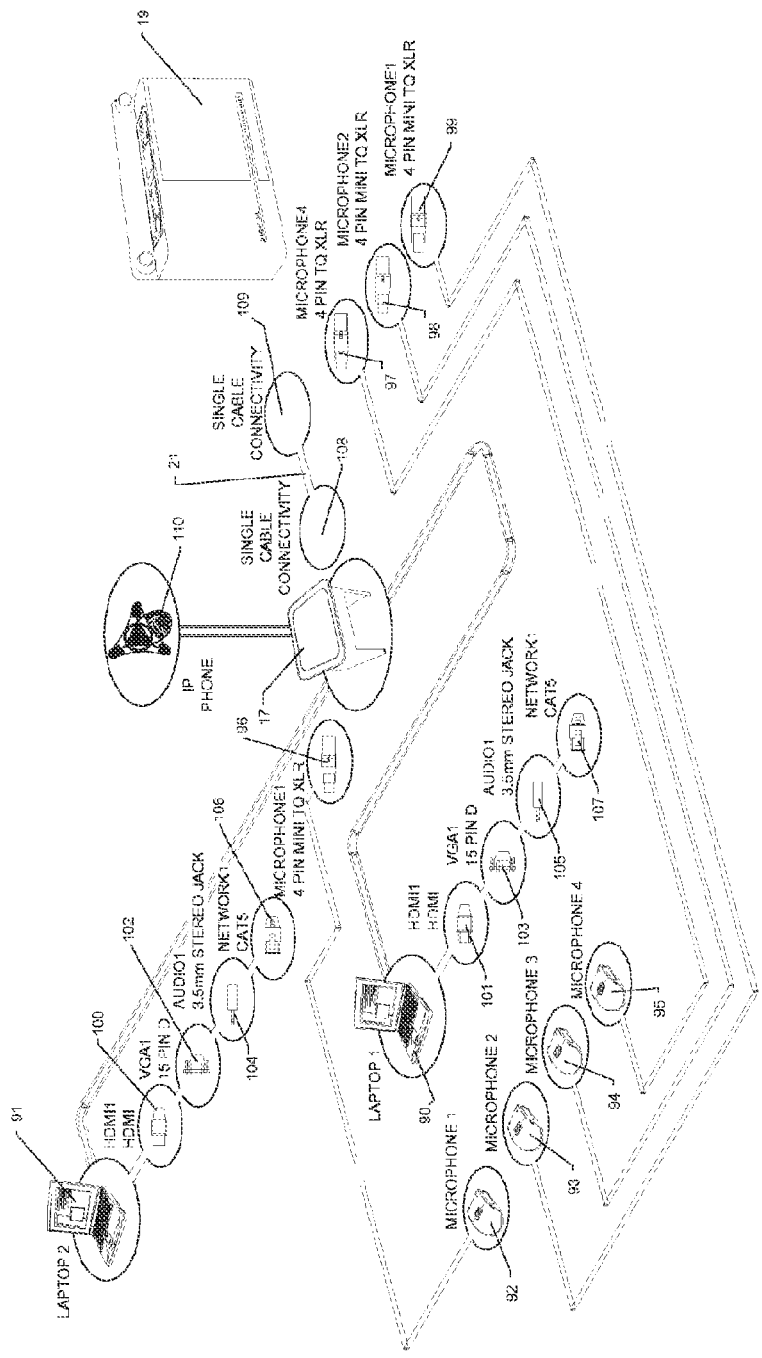
FIG. 11 is a schematic connection diagram illustrating the various connectivity options for the embodiments described hereinabove.

Embodiments of the invention may be provided for receiving two separate sets of inputs as illustrated by way of example in FIG. 11. Here, the interconnections for a twin screen system such as that illustrated in FIG. 10 are shown, with the desk-mounted interface unit 17 shown with input connections to two user-supplied laptop computers 90, 91 and an IP phone 110. The interface unit 17 has connector sockets for four microphones 92, 93, 94, 95 having four microphone connector plugs 96, 97, 98, 99 of the four-pin mini XLR type. Various different types of connector sockets are provided on the interface unit 17 to receive input signals from the laptop computers 90, 91, dependent on the equipment provided. These may include HDMI sockets 100, 101, VGA sockets 102, 103, audio stereo jacks (3.5 mm type) 104, 105, or ethernet network sockets 106, 107.

A dedicated single cable connection via sockets 108, 109 provides connection between the interface unit 17 and a control processor 19 as schematically illustrated in FIG. 11.

The interface or transmitter unit 17, together with the receiver or control processor 19, provide a fully integrated complete "out of the box" room connectivity and control solution, with the control processor 19 housing all system components normally found in an integrated twin screen room system, including video and audio signal sensing, optimization, routing, scaling and control equipment. Likewise, dedicated HD Codec video and audio connectivity and control are provided, together with an auxiliary HD input for a TV tuner or some other device. The control processor 19 further provides independent presentation feeds from the interface unit 17, scaled and optimized independently for the local display and the Codec unit, ensuring that each is provided with an input at the optimum resolution.

The control processor 19 also provides for the connectivity of the third party components including touch-screen control systems and peripheral control devices via an RS232, RS485 or IP control cables (not shown). Additional connectivity is provided from the unit to allow for balanced microphones to be connected through the cable 21 to the control processor allowing multi microphone installations to be deployed without additional installed cabling.

Further, as can be seen particularly in FIG. 3, an IP telephone 110 may be connected via a separate cable 111 to a plug 112 passing through the opening 56 in the plinth 15 into the interior of the pedestal 14 for connection to the user-installed Codec unit 65.

In use of the system described hereinabove the user merely needs to connect his or her laptop computer to the interface unit 17 to commence a presentation. The interface unit 17 has a plurality of different input connections for laptop computers, which may be either analogue VGA or digital HDMI/DVI. There are also two line level audio inputs for sound associated with the laptop inputs and ethernet connection for VoIP conference telephone. An inbuilt microphone and four balanced microphone channels and also provided, as is an RS485 serial interface.

The unit 17 also has a set of control buttons which are not individually illustrated, but which are labelled as "Laptop 1", "Laptop 2", Video Conferencing", "Auxiliary Input", "volume up/down", and "VC mic mute".

The operation of the system is as follows:
1) The user connects a laptop in input 1. The system automatically switches on, displays the image from the laptop screen at the highest quality resolution full screen scaling. Laptop button 1 turns green indicating that the laptop is connected and displayed.
2) If a second user connects a laptop to laptop input 2, as the system is already on and displaying laptop1, the button turns blue to indicate a valid connection. If button 2 is now pressed, the on screen image switches to laptop2. Button 2 goes green and button 1 goes blue.
3) If the user either presses a button with nothing connected or connects a laptop, but fails to configure it to output a signal, the button flashes red to indicate an error condition.
4) As soon as both laptops are disconnected, the system switches the screen 12 off.
5) If a video conferencing (VC) call comes into the codec unit, the system will automatically turn on and display the VC image on the screen 12.
6) If a laptop is displayed when a call comes in, then the screen 12 will automatically switch over and display the VC image.
7) When no call is in progress and there is no active laptop, the system will automatically switch off when the VC codec goes into standby (sleep) mode. This ensures minimum power consumption.

The single processor 19 thus performs all the functions for which previously it was necessary to provide a wide array of individual devices. The processor 19, and the desktop transmitter unit 17 are together programmed so to provide switching and scaling of the signals from the laptop computer 18 to optimise the images projected on the display screen 12 and on the screen of the laptop computer and, together with the codec 20, cooperate to ensure that the images transmitted to a remote location are likewise optimised for the most appropriate presentation in terms of resolution and screen size. The unit 17 switches and optimises the signal from the laptop computer 18 before the signal is transmitted on the cable 21 to the unit 19, and the signal is then split in two, depending on its intended destination, and optimised for display on the screen 12 and for the codec unit 20.

Figure 12:
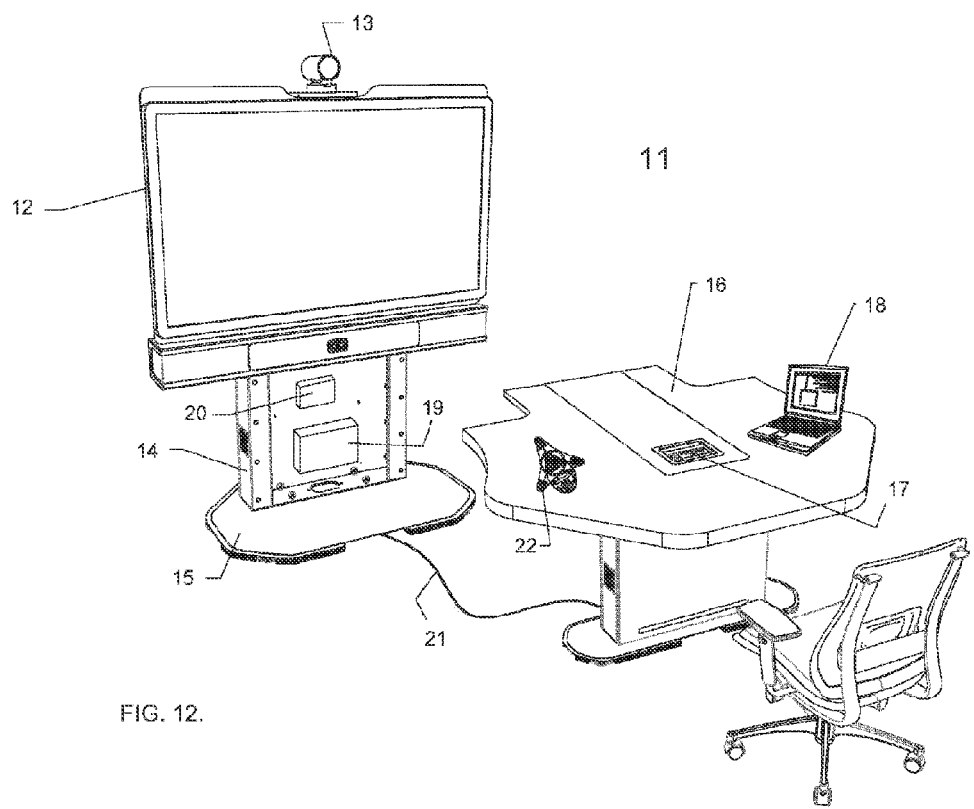
FIG. 12 is a perspective view of an alternative embodiment of the system of the invention.
Figure 13:
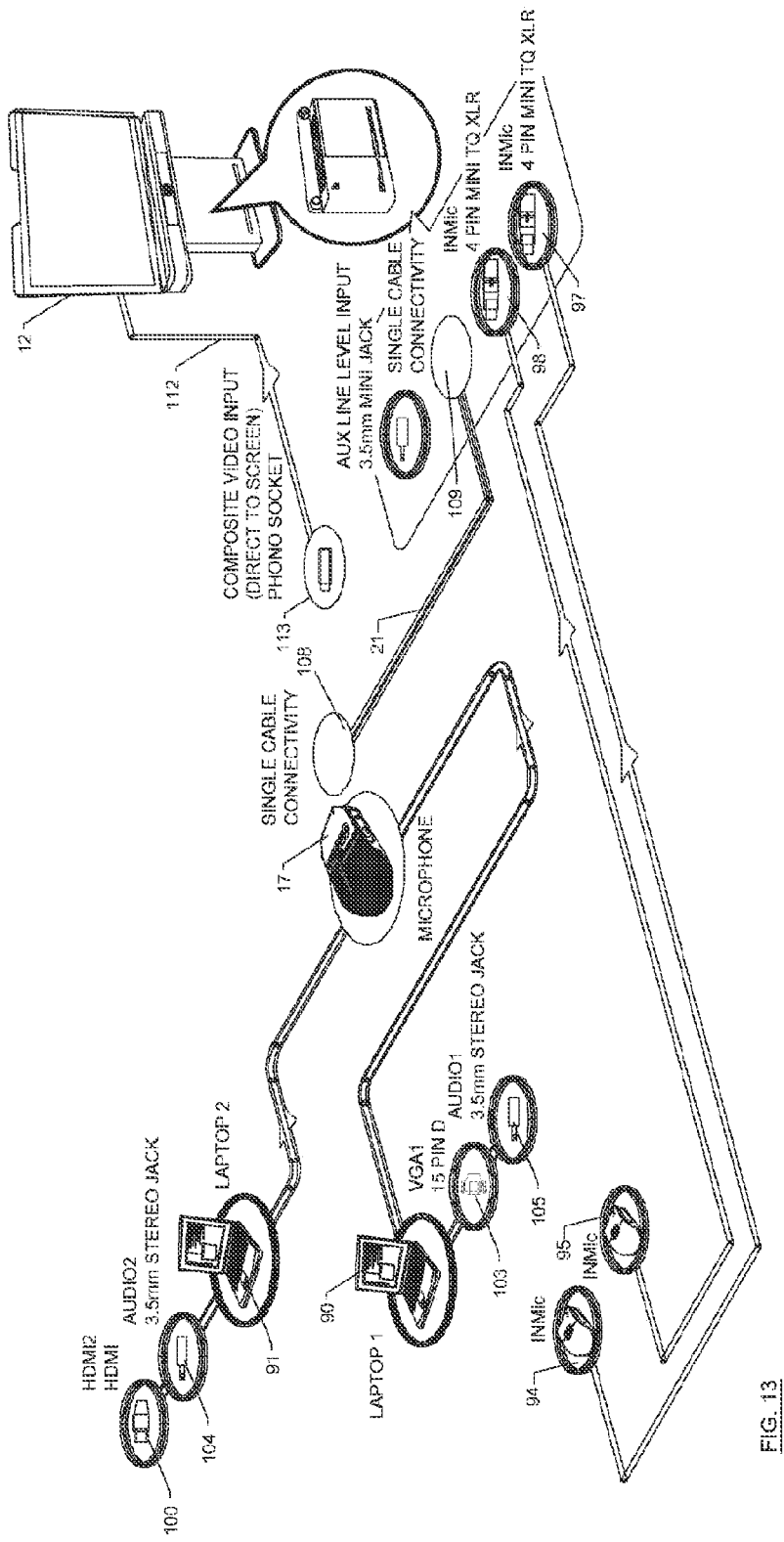
FIG. 13 is a schematic connection diagram of a further alternative embodiment of the invention.

FIG. 12 is a perspective view of an alternative embodiment of the system of the invention, and FIG. 13 is a schematic connection diagram of the further alternative embodiment of the invention depicted in FIG. 12.

In the system of FIG. 12, the desk part 16 is a freestanding or floating unit that is not attached to the pedestal 14. Those components which are the same as in FIGS. 1 (and 2) are indicated with the same reference numerals. Accordingly, it will be appreciated that the system is largely the same except for the provision of having a desk unit that can be independently moved from the pedestal and display unit.

FIG. 13 illustrates a system similar to that of FIG. 11, but with simplified connectivity. Those components which are the same as in FIG. 11 are indicated with the same reference numerals. In this system there is an internal microphone in the interface unit 17 and therefore only two external microphones 94, 95 are provided. In addition a direct to screen composite video input phono socket 113 connected to the screen 12 by a line 112 is provided.

Although there are references herein to high definition (HD) equipment and connections, it will be appreciated that such equipment and connections can be standard or other definition. For example, it is possible that dedicated Codec video and audio connectivity and control can be provided by a device that is capable of operating in or at HD or some other suitable definition. Associated input for a TV tuner or some other device can therefore be provided in the form of auxiliary inputs for example that are operable to accommodate an HD or other suitable definition signal, such as standard definition for example. It will be appreciated that reference to HD is not intended to be limiting to any particular definition.

According to an example, a presentation and display system for displaying images on a monitor or display screen is provided, having a user interface unit connectable to a user-selected input device, and processor means for adapting the signal input thereto into a format optimised in scale and resolution for display on the screen. A codec unit for video teleconferencing can be provided, and the processor can optimise the signals from the user input device for onward transmission by the codec to r a remote location.

We claim:

1. A presentation and display system comprising a pedestal mounted on a plinth, a display screen or monitor carried by the pedestal, and an internal receiver/processing unit mounted on the said pedestal, wherein the plinth, display screen or monitor, and internal receiver/processing unit are secured together by manually operable releasable fasteners, and an interface/transmitter unit having means for connection to a user-input device and operable to transmit signals therefrom to the internal receiver/processing unit for display on the monitor or display unit.

2. A system as claimed in claim 1, in which the pedestal has a mount for receiving a Codec connectable to the monitor or display unit.

3. A system as claimed in claim 1, in which the said plinth has feet adjustable to vary the orientation of the monitor or display unit.

4. A system as claimed in claim 3, in which the said plinth unit has manipulation means accessible from above the plinth for effecting adjustment of the said feet.

5. A system as claimed in claim 3, in which the said plinth has means for indicating the orientation thereof upon adjustment of the said foot adjustment means.

6. A system as claimed in claim 4, in which the said plinth includes a decorative cover panel for concealing the foot adjustment means.

7. A system as claimed in claim 1, in which the pedestal has a front cover panel removably mounted thereon for replacement with alternative such panels.

8. A system as claimed in claim 7, in which the said pedestal has a rear cover panel releasably mounted thereon.

9. A system as claimed in claim 8, in which the said front and/or rear cover panel of the pedestal is held in position by magnetic means.

10. A system as claimed in claim 1, in which the said interface unit is connectable to the monitor/display unit by a single cable.

11. A system as claimed in claim 1, in which the said interface unit is provided with a radio frequency transmitter and the said control/processor unit has a radio frequency receiver for communicating therewith.

12. A presentation and display system comprising a pedestal mounted on a plinth, a display screen or monitor carried by the pedestal, an internal receiver/processing unit mounted on the said pedestal, wherein the plinth, display screen or monitor, and internal receiver/processing unit are secured together by manually operable releasable fasteners, and an interface/transmitter unit having means for connection to a user-input device and operable to transmit signals therefrom to the internal receiver/processing unit for display on the monitor or display unit, wherein the pedestal has a front cover panel removably mounted thereon for replacement with alternative such panels in which the said front and/or rear cover panel of the pedestal is held in position by magnetic means.

13. A system as claimed in claim 12, in which the said interface unit is connectable to the monitor/display unit by a single cable.

14. A system as claimed in claim 12, in which the said interface unit is provided with a radio frequency transmitter and the said control/processor unit has a radio frequency receiver for communicating therewith.

* * * * *